US009970735B2

(12) United States Patent
Walker (10) Patent No.: US 9,970,735 B2
(45) Date of Patent: May 15, 2018

(54) TELESCOPIC SIGHT

(71) Applicant: DEBEN GROUP INDUSTRIES LIMITED, Melton, Woodbridge Suffolk (GB)

(72) Inventor: Paul Walker, Woodbridge Suffolk (GB)

(73) Assignee: Deben Group Industries Limited, Melton, Woodbridge Suffolk (GB)

( * ) Notice: Subject to any disclaimer, the term of this patent is extended or adjusted under 35 U.S.C. 154(b) by 0 days. days.

(21) Appl. No.: 15/512,310

(22) PCT Filed: Sep. 22, 2015

(86) PCT No.: PCT/IB2015/057306
§ 371 (c)(1),
(2) Date: Mar. 17, 2017

(87) PCT Pub. No.: WO2016/051312
PCT Pub. Date: Apr. 7, 2016

(65) Prior Publication Data
US 2018/0023922 A1    Jan. 25, 2018

(30) Foreign Application Priority Data

Sep. 29, 2014   (GB) ..................................... 1417177

(51) Int. Cl.
*F41G 1/38*     (2006.01)
*G02B 23/14*    (2006.01)

(52) U.S. Cl.
CPC ............... *F41G 1/38* (2013.01); *G02B 23/14* (2013.01)

(58) Field of Classification Search
CPC ....................................................... F41G 1/38
(Continued)

(56) References Cited

U.S. PATENT DOCUMENTS 4,643,542 A    2/1987  Gibson
6,279,259 B1   8/2001  Otteman
(Continued)

FOREIGN PATENT DOCUMENTS

EP          0 153 740        9/1985

OTHER PUBLICATIONS

International Search Report and Written Opinion of the International Searching Authority (PCT/IB2015/057306) dated Mar. 29, 2016, 8 pages.
(Continued)

*Primary Examiner* — Reginald Tillman, Jr.
(74) *Attorney, Agent, or Firm* — Burr & Brown, PLLC (57) ABSTRACT

A telescopic sight for a firearm, comprising an external housing and a manually adjustable sighting adjustment mechanism comprising a manual adjustment control and a plunger. The optical system comprises a sighting assembly with a movable member for adjusting sighting. The plunger is slidably in a port in the housing, linking the adjustment control with the movable member. Manual adjusting the manual control causes the plunger to move the movable member, making the sighting adjustment. The housing interior remains atmospherically sealed as the plunger slides in the port. The manual adjustment control is removably affixed to the housing, and the manual adjustment control is fully separable from the plunger which remains slidably engaged and retained in the port when the manual adjustment control is removed from the housing, in order to maintain the atmospheric seal of the housing interior.

25 Claims, 6 Drawing Sheets

(58) Field of Classification Search
USPC .......................................... 42/119, 122, 123
See application file for complete search history.

(56) References Cited

U.S. PATENT DOCUMENTS

| | | | |
|---|---|---|---|
| 6,691,447 B1 | 2/2004 | Otteman | |
| 7,350,329 B1* | 4/2008 | Bell | F41G 1/54 |
| | | | 42/122 |
| 8,984,796 B2* | 3/2015 | Thomas | F41G 1/28 |
| | | | 42/119 |
| 9,665,120 B2* | 5/2017 | Windauer | F41G 1/38 |
| 9,677,848 B2* | 6/2017 | Hamilton | F41G 1/38 |
| 2008/0236018 A1 | 10/2008 | Halverson | |
| 2010/0175298 A1 | 7/2010 | Thomas et al. | |
| 2013/0160344 A1* | 6/2013 | Thomas | F41G 1/18 |
| | | | 42/122 |
| 2013/0312310 A1* | 11/2013 | Geller | F41G 1/38 |
| | | | 42/122 |
| 2016/0231554 A1* | 8/2016 | Tang | G02B 7/04 |

OTHER PUBLICATIONS

UK Search Report (GB 1417177.1) dated Mar. 30, 2015, 3 pages.
International Search Report (PCT/EP2014/075589) dated Jul. 18, 2015, 3 pages.

* cited by examiner

TELESCOPIC SIGHT

BACKGROUND a. Field of the Invention

The present invention relates to a telescopic sight for a firearm, having an external housing and at least one manually adjustable sighting adjustment mechanism including a manual adjustment control mounted on the housing.

b. Related Art

Telescopic sights for firearms, for example a pistol or rifle, typically have a tubular external housing and a pair of manually adjustable sighting mechanisms including a manual adjustment control mounted on the housing, one for adjusting windage and the other for adjusting elevation. Such a telescopic sight will have an optical system housed by the housing, which comprises opposite objective and eyepiece lenses and in between these lenses within the housing a sighting element bearing a graphic image pattern that is optically arranged with respect to the objective and eyepiece lenses, such that the graphic image pattern provides the aiming point in a telescopic image generated by the objective and eyepiece lenses.

The manual adjustment controls are usually part of a generally cylindrical assembly, referred to as a turret assembly or simply as a turret. The elevation turret has a rotatable elevation knob which, when turned, causes the aiming point to move up or down, and the windage turret has a rotatable windage knob which, when turned, causes the aiming point to move left or right.

Optionally, there may be a pair of removable protection caps, for example rubber caps, each of which snaps over one of the turret knobs after the sighting adjustment has been made.

There are many different types of known sighting elements, but the most common type is a reticle, of which there are two types: wire reticles and etched reticles. Wire reticles are made out of metal wire or thread and are mounted in an optically appropriate position inside the housing. Etched reticles are images of the desired reticle layout that are etched on an optic element, usually a plain disc or a lens made from a clear glass or plastic material, which is then mounted in the telescopic sights tube as an integrated part of the optics chain of the sight. The particular type of sighting element and graphic image pattern presented by the sighting element is not central to the present invention.

Telescopic sights are normally equipped with a parallax compensation mechanism which essentially consists of a movable optical element that enables the optical system to project a telescopic image of objects at varying distances and the graphic image together in exactly the same optical plane. The optical system between the objective and eyepiece lenses normally includes an erector lens so that the eyepiece image is correctly oriented and not inverted. Therefore, there are normally two focal planes inside the housing along an optical axis defined by the objective and eyepiece lenses, a front focal plane or a rear focal plane, and the sighting element may be located at either of these focal planes. On fixed power telescopic sights there is no significant difference between these two options, but on variable power telescopic sights the front plane location remains at a constant size compared to the target, while the rear plane location appears as a constant size to the user as the target image grows and shrinks. There are other advantages and disadvantages for both locations, however, the choice of location for the sighting element is not central to the present invention.

Usually, the sighting element and/or other associated internal optical components, such as an erector lens, are held by a movable mount inside the housing, most commonly a tube that has an axis that extends in substantially the same direction as the optical axis of the telescopic lens system. Any such movable mount is referred to hereinafter as a movable member. The manual adjustment controls are arranged to move the movable member, and hence the sighting element and/or other associated internal optical components in orthogonal directions in order to generate an apparent movement of the graphic sighting image in the telescopic image, thereby adjusting the aiming point. The movable member is often arranged to pivot at one end, and depending on the location of the sighting element in either the front or rear focal plane, the sighting element may move with the movable member, or may remain substantially fixed in place while other associated optical components, such as an erector lens, move with the movable member. However, the particular mounting and movement arrangement of the sighting element and/or other associated internal optical components is not central to the invention.

Each rotatable turret knob is linked to an actuator including a linkage mechanism and a plunger which extends to the interior of the housing. Together, the rotatable turret knob and linkage mechanism form a turret assembly and provide a manual adjustment control for making a sighting adjustment. The linkage mechanism converts the rotational movement of the turret knob to movement of the plunger to cause a corresponding shift in the transverse orientation of the sighting element and/or other associated internal optical components. So that a user can judge how far to turn each knob, the manual adjustment mechanism usually comprises a click-stop mechanism to quantize the rotation and hence movement of the plunger and the corresponding adjustment to the aiming point. Different types of telescopic sights have different gradations in movement.

For example, a telescopic sight intended for air guns or small bore rim fire rifles will have an adjustment mechanism in which each single click of adjustment will change the aiming point by approximately ¼" (6.4 mm) at a range of 100 yards (91.7 m). In general, target or long range telescopic sights may have finer graduations than this and hunting telescopic sights may have coarser graduations than this.

To maintain a clear image, it is important that telescopic sights should be waterproof and fog-proof at least to some degree. If water or water vapour gets inside the optical system housed by the housing, then liquid water or condensation can obscure the image. No seal is absolute and the term "atmospherically sealed" as used herein includes a range of degrees of seal against dust, water or vapour ingress needed to maintain a clear image across a range of typical environmental operating conditions. Quite often, the sealed interior of the telescopic sight will be filled during manufacture and assembly with a dry and substantially inert gas, for example dry $N_2$, and then atmospherically sealed to retain the dry gas and to help prevent ingress of liquid water, water vapour, dust or dirt.

Because users demand sighting adjustment mechanisms with different click sensitivity for different applications, the housings of telescopic scopes are formed with an aperture to which a range of different sighting adjustment mechanisms may be affixed during manufacture. When fitted, each sighting adjustment mechanism closes and seals the aperture around which it is mounted, thereby helping to maintain the atmospheric seal. One example of such a telescopic sight having a sealed mounting aperture is described in EP 0 153 740 A2.

This sealing arrangement is, however, inconvenient if the sighting adjustment mechanism needs to be repaired or if a user wishes to use a sighting adjustment mechanism having a differing click-stop mechanism, as a replacement or change in the sighting adjustment mechanism cannot easily be done by the user without ruining the atmospheric seal. A user may therefore need to have several different telescopic sights with different sighting adjustment mechanisms for different uses.

Another example of a telescopic sight having a sealed mounting aperture is described in U.S. Pat. No. 6,279,259 B1. A sighting adjustment mechanism is supported in a counter-bore formed in a boss on an outer tube of a rifle scope. The sighting adjustment mechanism comprises a dial having a scale marked on its top and an adjustment nut which when turned by the dial causes an in-out movement of an adjustment plunger that passes through a rectangular hole in the outer tube to act on an inner tube for an erector lens assembly. The sighting adjustment mechanism comprises between the dial and the adjustment nut a dial retainer to which the dial is removably affixed. The adjustment nut is secured to the boss by a threaded flange and the dial retainer is fixed to the adjusting nut by screws. The sighting adjustment mechanism also comprises between the adjustment nut and the outer wall a click ring and a click plunger to provide audible and tactile clicks as the adjustment nut turns. O-ring seals are provided around the boss between the outer wall and the adjustment nut and the threaded flange to maintain a gas tight seal of the rifle scope. A user can disconnect by hand the dial from the dial retainer to remove the dial from the rest of sighting adjustment mechanism and then replace this with another dial having a different scale. This is done without disconnecting the rest of the sighting adjustment mechanism from the outer tube of the telescopic sight. This retains the plunger in the rectangular hole and keeps the O-ring seals in place and so maintains the gas tight seal of the rifle scope.

US 2010/0175298 A1 describes a sighting adjustment mechanism comprising a turret cap or dial having a scale and a mechanism referred to as a saddle assembly inside of which is a central shaft which when turned by the turret cap causes an in-out movement of a plunger. In this apparatus, the plunger is retained to the central shaft of the sighting adjustment mechanism. The sighting adjustment mechanism comprises a quick release assembly between the turret cap and central shaft so that a user can disconnect and remove the turret cap by hand and replace it with another turret cap having a different scale. As with U.S. Pat. No. 6,279,259 B1, the rest of the sighting adjustment mechanism, in this case the saddle assembly including the central shaft and a click mechanism, remains attached to the outer tube of the rifle scope to maintain a gas tight seal.

It is an object of the present invention to provide a more convenient telescopic sight for a firearm.

SUMMARY OF THE INVENTION

According to a first aspect of the invention, there is provided a telescopic sight for a firearm, comprising a housing, an optical system housed by the housing for presenting a telescopic image and an aiming point in said image to a user of the telescopic sight, and at least one sighting adjustment mechanism for making a sighting adjustment of said aiming point relative to said image, said sighting adjustment mechanism comprising a movable plunger and a manual adjustment control configured to move said movable plunger, the manual adjustment control comprising a rotatable turret knob, the turret knob being accessible to said user on the housing for manually effecting said sighting adjustment, wherein:

the optical system comprises within the housing at least one movable member, movement of said movable member causing said sighting adjustment;

the housing has a port therethrough, the plunger being slidably engaged in said port and linking the manual adjustment control with the movable member whereby, in use, the manual adjustment control causes the plunger to slide in said port when the turret knob is rotated resulting in said movement of the movable member to make said sighting adjustment, said slideable engagement being such that the housing interior remains atmospherically sealed as the plunger slides in said port; and the manual adjustment control is removably affixed to the housing, characterised in that the manual adjustment control comprises an actuation surface that makes abutting contact with an outer end surface of a stem of the plunger so that when the manual adjustment control is to be disconnected from the housing in order to remove the manual adjustment control from the housing, the actuation surface separates from said outer end surface to enable the manual adjustment control to fully separate from the plunger whereby the plunger remains slidably engaged in said port when the manual adjustment control is removed from the housing in order to maintain said atmospheric seal of the housing interior when the manual adjustment control is removed from the housing.

The manual adjustment control may comprise a linkage mechanism that converts the rotational movement of the turret knob to movement of the plunger.

In preferred embodiments of the invention, the linkage mechanism is provided by an inner turret assembly, the turret knob extending around the inner turret assembly. The turret knob and the inner turret assembly then form a turret assembly.

The movement of the plunger preferably causes a corresponding movement of the movable member of the optical assembly. In this way, the sighting adjustment is made. The sighting adjustment may be a corresponding shift in the transverse orientation of the sighting element, and/or other associated internal optical components, for example to cause a change in magnification.

The manual adjustment control is therefore configured to cause the plunger to slide in the port when the turret knob is rotated resulting in movement of the movable member to make the sighting adjustment.

The optical system will, in general, comprise an objective lens, an eyepiece lens and between the objective and eyepiece lenses an adjustable sighting assembly including a sighting element bearing a graphic image pattern that is optically arranged with respect to the objective and eyepiece lenses such that the graphic image pattern provides the aiming point in the telescopic image visible to a user of the sight.

The adjustable sighting assembly then comprises said at least one movable member for adjusting the optical arrangement of the sighting assembly with respect to the objective and eyepiece lenses. In this way, movement of the movable member of the optical system causes the sighting adjustment.

The housing may be elongate with opposite first and second ends, such that the objective lens is proximate the first end of the housing, and the eyepiece lens is proximate the second end of the housing opposite the first end. The objective lens and eyepiece lens then define an optical axis of the telescopic sight.

In preferred embodiments of the invention, there are two of the sighting adjustment mechanisms each having a manual adjustment control accessible to the user on the housing for manually effecting a sighting adjustment of the aiming point relative to the image along two corresponding orthogonal directions.

The port in the housing for the plunger may comprise any type of aperture or passage through the housing, but is preferably a cylindrical passage, and may also comprise a sealing means such as an O-ring extending around the plunger in contact with both the housing and the plunger to maintain an effective atmospheric seal as the plunger slides in and out of the housing.

The ability to remove and re-attach the manual adjustment control permits a user of the telescopic sight to change the manual adjustment control for another manual adjustment control, which may be desirable, for example, in order to change the range or movement and/or sensitivity and/or click-stop gradations provided by a click-stop mechanism of the manual adjustment control. The invention therefore provides long-term flexibility to the user, who can change the manual adjustment control and so change the performance of an existing telescopic sight without adversely affecting the environmental seal of components within the telescopic sight, thereby possibly avoiding the need to buy a new telescopic sight.

In addition, if a manual adjustment control is damaged or becomes worn in use, then the repair of the telescopic sight may readily be performed by the user who may then fit a new manual adjustment control without having to send the entire telescopic sight back to the manufacturer for repair.

The atmospheric seal will in practical terms be maintained during removal and re-attachment of the manual control adjustment, if the environment within the sealed interior of the housing is not adversely affected, for example, by loss of dry gas filling the interior, or by ingress of water vapour or contaminants.

The adjustable sighting assembly will normally comprise a biasing means, for example a coil spring or a leaf spring, arranged to apply a force to the movable member which acts in a direction against movement of the movable plunger towards the interior of the housing. This helps to maintain a positive contact between the movable member and the plunger. As this will, however, tend to urge the plunger in a direction out of the aperture in which the plunger is slidably seated, it is particularly advantageous if means are provided to limit the sliding movement of the plunger in an outwards direction relative to the housing interior, so that the seal is not broken by the plunger coming loose from the housing after removal of the manual adjustment mechanism.

The housing may be a unitary body, but will most often be formed from separate components that are secured together by means which can be expected to preserve the atmospheric seal within the housing for an expected design lifetime of the telescopic sight. The housing may comprise one or more sealing members between each part of the housing and between the housing and adjacent external components, particularly the objective and eyepiece lenses at opposite ends of the housing. Similarly, there will most usually be one or more sealing members, for example an O-ring, to provide an atmospheric seal between the port and the plunger.

The term "lens" as used herein, for example objective "lens" and eyepiece "lens", includes optical systems comprising a single lens element. However, it is more commonly the case that multiple lens elements are used in conjunction with one another to provide such "lenses". Therefore, the term "lens" is not limited to cases of single lens elements, but also extends to multi-lens element arrangements.

Preferably, at least one retention feature is provided between the plunger and the housing in order to prevent the plunger from being withdrawn from the port when the manual adjustment control is removed from the housing. This ensures that the atmospheric seal of the housing is not lost by removal of the plunger from the port.

The plunger is preferably configured to be retained by the port when the manual adjustment control is disconnected from and fully removed from the housing.

The retention feature may be an end-stop on the plunger which engages with a surface inside of the housing when the plunger reaches a limit of motion in a direction out of the housing.

The housing is preferably an elongate tubular housing.

In preferred embodiments of the invention, the movable member is a tubular member. The movable member may hold a lens system, for example an erector lens, to invert the telescopic image provided to the user, so that up-down and left-right are correctly oriented.

The movable member may be a sighting element mounted within the housing, for example, a tubular mount inside of which is held the sighting element and/or other optical elements such as an erector lens.

The graphic image pattern may be any type of pattern, cross-hairs or image that is useful to indicate to the user an aiming point. The sighting element may be a reticle bearing the graphic image sighting element and may be positioned at an internal focus point along the optical axis.

The movable member may move the sighting element, which will be convenient when the sighting element is positioned at a focus point in proximity with the sighting adjustment mechanism. Alternatively, the sighting element may be fixed relative to the optical axis and the movable member may move other optical elements within the optical system, such as an erector lens.

It will of course most generally be the case that the housing comprises an external wall, within which the port for the plunger may then be provided in the external wall.

The plunger is preferably part of a linear actuator mechanism.

The plunger may bear directly on the movable member within the housing, which may be a movable mount for the sighting element or for another optical component, such as an erector lens. The manual adjustment control accessible on the housing is then configured to activate the plunger to move towards and away from the movable member or mount.

The plunger may move linearly along an axis that is transverse to the optical axis defined by the objective and eyepiece lenses.

The flange may then be at an endmost portion of the plunger.

The retention feature for the plunger may be a projecting flange that engages with an abutment inside the housing.

The housing may have a main body, which extends over at least a central portion of the housing between the objective and eyepiece lenses. The port may then be provided by a hole in the main body.

According to a second aspect of the invention, there is provided a telescopic sight kit comprising a telescopic sight for a firearm, said sight being according to the first aspect of the invention, the kit further comprising separate from the telescopic sight at least one manual adjustment control that is interchangeable with at least one manual adjustment control of the telescopic sight without breaking the atmospheric seal of the housing interior.

BRIEF DESCRIPTION OF THE DRAWINGS

The invention will now be further described, by way of example only and with reference to the accompanying drawings, in which.

DETAILED DESCRIPTION

Figure 1:
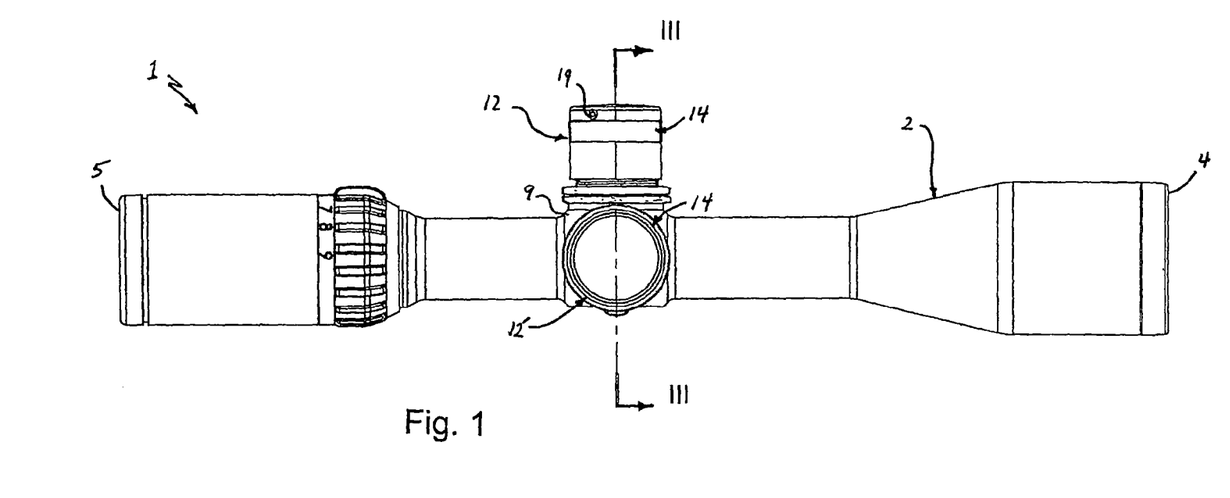
FIG. 1 is a side view of a telescopic sight according to a first preferred embodiment of the invention, having a pair of sighting adjustment mechanisms, one for adjusting elevation and the other for adjusting windage.
Figure 2:
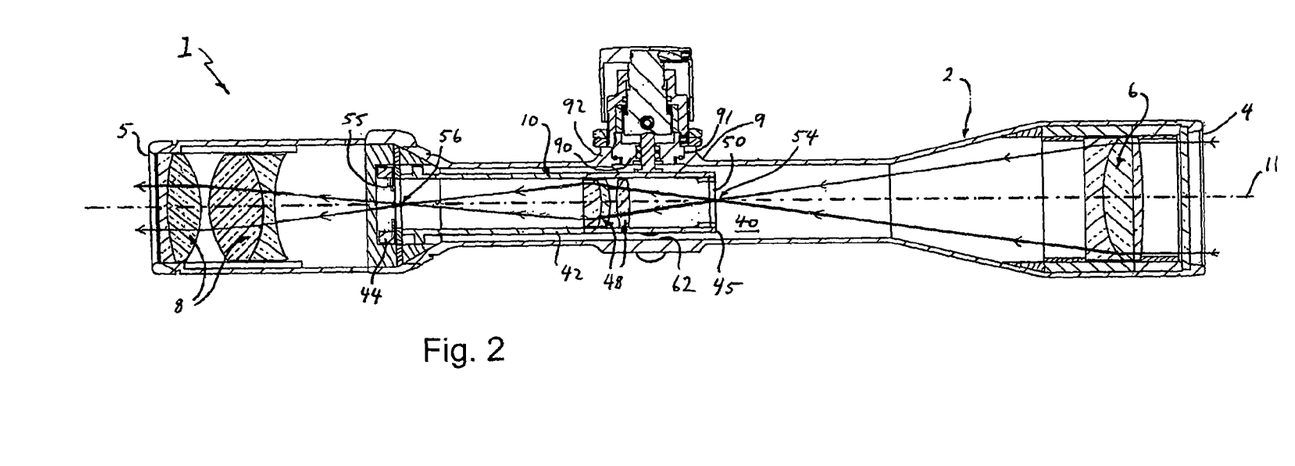
FIG. 2 is a cross-sectional view of the telescopic sight along an optical axis of the sight in the same plane as that of FIG. 1, showing how the elevation adjustment mechanism is arranged to move a movable member, including a graphic image element having a reticle.

FIGS. 1 and 2 show side and cross-sectional views of a telescopic sight 1 for a firearm. When mounted on a firearm, the telescopic sight presents to a user of the sight an aiming point in a telescopically magnified image.

The telescopic sight has an elongate external housing 2, of generally cylindrical shape, which will normally be composed of several metallic or plastic components joined together to form a sealed enclosure for optical components held within the housing between opposite objective and eyepiece ends 4, 5 of the housing.

The optical components include a multi-component objective lens 6 protected by a plain front cover glass 7, a multi-component eyepiece lens 8, and between these lenses in a central portion 9 of the housing, an adjustable sighting assembly 10. The opposite lenses 6, 8 define an optical axis 11 of the housing.

Figure 3:
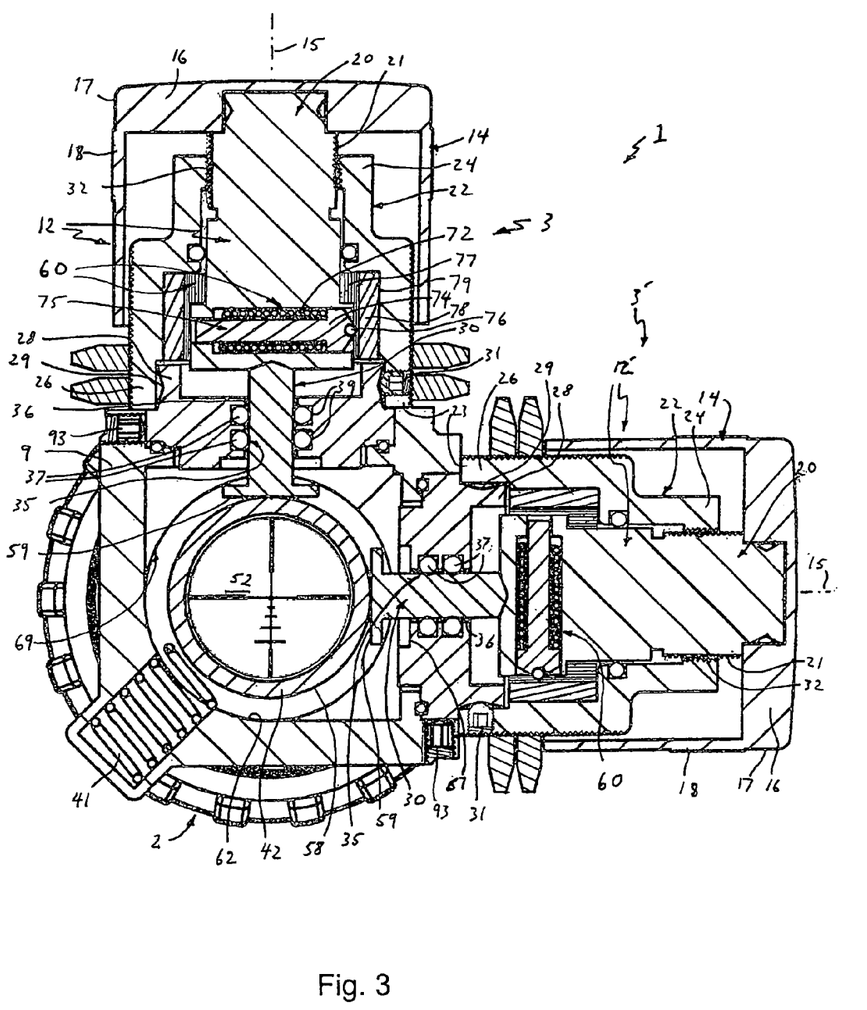
FIG. 3 is a cross-sectional view of the telescopic sight taken along the line III-III of FIG. 1, showing in detail the elevation and windage sighting adjustment mechanisms, each of which comprises a movable plunger activated by a manual adjustment control having a rotatable turret knob which, when turned, causes the plunger to slide in and out of a port in an outer housing, resulting in movement of the reticle.
Figure 4:
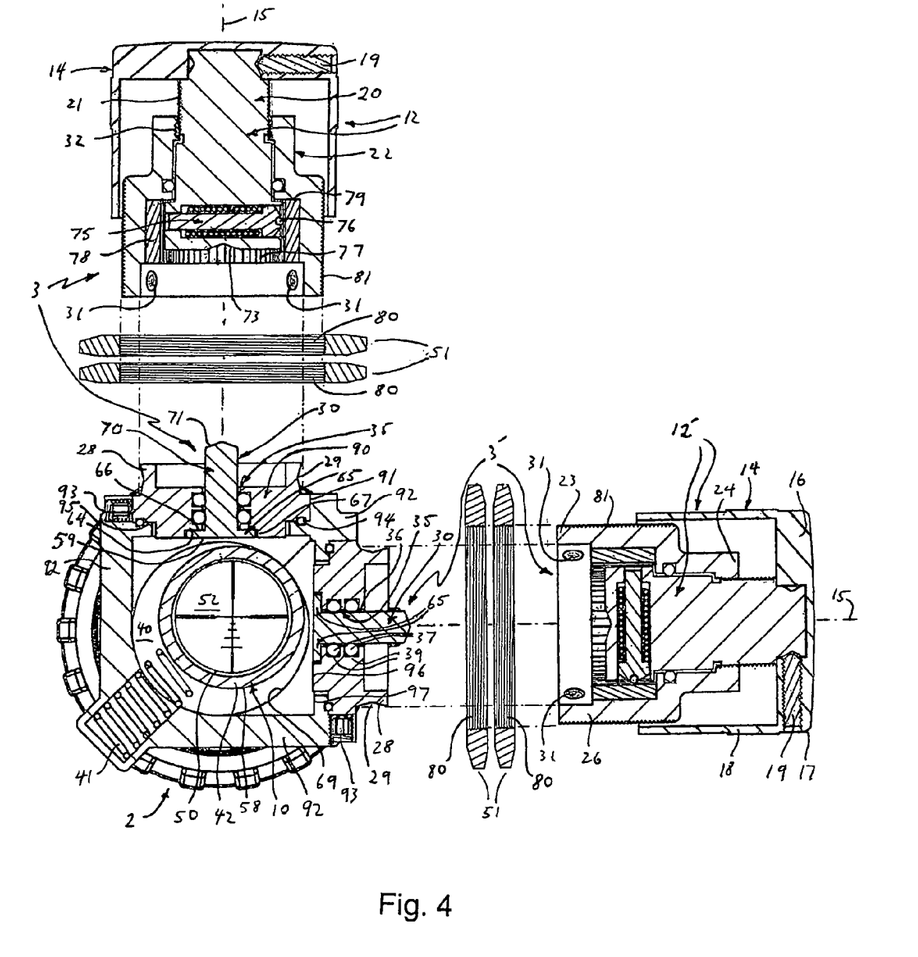
FIG. 4 is a cross-section view of the telescopic sight in the same plane as FIG. 3, showing how the manual adjustment control of each of the elevation and windage sighting adjustment mechanisms is removably affixed to the housing by means of a skirt on the manual adjustment control that is held to a collar on the housing by means of grub screws.

Mounted externally on the central portion of the housing is a pair of sighting adjustment mechanisms, one 3 for adjusting for elevation and the other 3' for adjusting for windage. Apart from being mounted for making orthogonal adjustments to the aiming point, the sighting adjustment mechanisms are the same. As shown in FIGS. 2 to 4, each sighting adjustment mechanism 3, 3' has a manual adjustment control 12, 12' and a movable plunger 30. In this example, each manual adjustment control is a turret assembly that comprises a rotatable turret adjustment knob 14 and an inner turret assembly 20, 22, 60 that provides a linkage mechanism that converts the rotational movement of the turret knob 14 to movement of the plunger, as will be explained in more detail below.

The turret adjustment knob 14 is generally symmetrical about a turret axis 15 that extends at right angles to the housing optical axis 11. The turret knob has at its end a mounting disc 16 and around a periphery 17 of the disc a tubular skirt 18 that extends towards the housing axis 11. Together, the disc 16 and skirt 18, which are formed as a one-piece component, provide the turret adjustment knob 14 in the form of a rotatable cap, which extends around the outermost or topmost part of the inner turret assembly 20, 22, 60.

The disc 16 is mounted centrally on the turret axis 15 by means of a grub screw 19 on a substantially cylindrical post 20 that has a threaded portion 21 nearest to the knob. Inside the knob, the manual adjustment control comprises a tubular mount 22 having opposite ends, one end 23 of which has a relatively large diameter and the other end 24 of which has a relatively small diameter. The mount has a cylindrically stepped inner and outer profile between these ends.

The mount large diameter end 23 forms a mounting skirt 26 that makes a close sliding fit around an annular collar 28 on the housing that extends away from the housing axis and around the turret axis 15. The collar 28 has around its outer periphery an annular V-shaped groove or channel 29 and the mounting skirt 26 holds three grub screws 31 equidistantly spaced around the skirt and which may be tightened to engage the grub screws with the groove 29 and so secure the tubular mount 22, and hence the rotatable cap 16, 18, to the housing 2. The grub screws 31 may also be loosened and disengaged from the V-shaped groove 29, in order to separate the tubular mount 22, and hence the rotatable cap 16, 18, from the housing 2. The skirt substantially conceals the collar when the manual adjustment control 12 is affixed to the housing.

The small diameter end 24 of the tubular mount 22 has an inwardly threaded ring 32 into which the post threaded portion 21 is screwed. When the cap 16, 18 is rotated, this threaded engagement between the post 20 and the tubular mount 22 causes the post 20 to move in towards and away from the housing along the turret axis 15.

The movable plunger 30 of each sighting adjustment mechanism 3, 3' is configured to move in a direction transverse to the optical axis 11 of the telescopic sight 1. The plunger 30 is slidably engaged in a port 35 that extends through the housing towards the housing axis 11. Both the plunger port 35 and the mounting collar 28 are centred on the turret axis 15. The port comprises a hole 36 that provides a substantially cylindrical passage through the housing and a seal for sealably engaging with the plunger as the plunger slides along the turret axis in either direction, towards or away from the housing axis. In this example, the seal comprises a pair of O-rings 37 seated in a pair of annular grooves 39 in the cylindrical passage 36. The O-rings may be of a synthetic rubber material, and may be lubricated with an inert silicone gel to provide smooth movement of the plunger. The seal should be good enough to provide an atmospheric seal so that an interior portion 40 of the telescopic sight inside the housing 2 is isolated from external atmospheric humidity or liquid water or other contaminants that come into contact with the sight. Preferably, the housing interior portion 40 is filled with dry nitrogen gas during manufacture and assembly of the telescopic sight 1.

The plunger is spring biased in a direction away from the housing axis 11 by a spring biasing means, which in this example is a coil spring 41 that acts against a movable member which, in turn, presses the plunger in a direction away from the housing axis. In this example, the movable member is a tubular inner housing 42 that provides a movable mount for internal optical components. The plunger port 35 is therefore between the manual adjustment control 14, 20, 22, 60 and the movable member 42.

The inner tubular housing 42 extends generally parallel with the housing axis 11 between opposite ends 44, 45 of the inner housing. One end of the inner housing 44 nearest the eyepiece lens 8 is pivotably mounted to the outer housing 2 so that an opposite free end 45 nearest the objective lens 6 is able to move in radial directions substantially transverse to the housing axis 11. The coil spring 41 is near the free end 45 of the inner housing and extends towards the housing axis at an angle of 45° to the turret axes 15 of each of the elevation and windage adjustment mechanisms.

The inner tubular housing 42 provides a movable support for optical components between the objective and eyepiece lenses 6, 8, including an erector lens 48 and a graphic image element 50 that is optically arranged with respect to the objective and eyepiece lenses 6, 8 such that a graphic image pattern 52 provided by the element gives to the user the aiming point in the magnified image seen by the user in the telescopic sight. In this example, the graphic image element 50 is a reticule etched with the graphic image pattern 52. The graphic image element 50 is provided at a first focal plane 54 of the objective lens 6 and an adjustable aperture 55 is provided at a second focal plane 56 of the eyepiece lens 8. The erector lens 48 has a pair of focal planes which coincide with those 54, 56 of the objective and eyepiece lenses so that the erector lens flips or inverts the image presented to the user so that this is the right way up.

The optical and mechanical arrangement of the elements within the housing is conventional, and other arrangements known to those skilled in the art may alternatively be used. The internal tube is not shown in all its detail, as the particular design of the internal tube is not germane to the present invention. In some designs, the graphic image element is fixed in position at the end of the internal tube where this is held in a pivot socket. A moving lens then causes an apparent shift of the graphic image pattern. All such arrangements, however, will include at least one movable member which, when moved by a sighting adjustment mechanism 3, 3', causes a corresponding change in a graphic image pattern indicating the aiming point to the user. Therefore, although in this example, the movable member is the inner tubular mount, other arrangements within the scope of the present invention may comprise alternative known types of movable member for an adjustable sighting assembly.

In this example, the movable inner tubular member 42 is biased by the spring 41 such that an outer surface 58 of the tubular member 42 presses against a plunger inner end surface 59 of each the plungers 30 when each plunger is moved and positioned by the corresponding adjustment control 12, 12' to extend to the inside of the housing interior 40.

The plungers 30 remain attached to the housing at all times in order to help preserve the isolation of the housing interior 40 from the external environment, even when the tubular mount 22 is disconnected from the mounting collar 28 of the housing. Furthermore, each of the plungers maintains an atmospheric seal in the housing interior 40 with the help of the seal 37 in the corresponding plunger port 35 as the plunger 30 moves within limits of movement along the turret axis 15.

In one direction of movement towards the housing axis 11, the movement of each plunger 30 is limited by the movable inner tubular member 42 when this contacts an internal surface 62 of the outer housing opposite the port 35. In the opposite direction of motion outwards along the turret axis 15, the movement of the plunger is limited by a retention feature 64 on the plunger within the sealed interior of the outer housing. In this example, and as shown most clearly in FIG. 4, the retention feature is provided by an end-stop in the form of annular flange 64 that forms a plunger head 65. The plunger head comes into contact with an abutment in the housing, which in this example is an inner surface 66 of the housing interior, which is in a recess 67 matching the shape of the plunger head so that this can retract fully to a position that is recessed relative to a cylindrical bore 69 in the central portion of the housing interior 40. During manufacture, this allows the plungers 30 to be moved to a recessed position that does not interfere with the assembly of the adjustable sighting assembly 10 inside the housing 2.

When the manual adjustment control 12, 12' of each sighting adjustment mechanism 3, 3' is to be attached to the housing 2 by the tubular mount 22, each of the plungers 30 is pressed inwards along the turret axis 15 when an outer end surface 71 of a plunger stem 70 comes into abutting contact with an opposing end surface 73 of the cylindrical post 20, which is an actuation surface of the manual adjustment control. This abutting contact allows relative rotational movement of the post and plunger. The post 20 is rotationally fixed to the knob 14, and so, as the rotatable cap 16, 18 is turned in one direction, the post 20 rotates and is driven inwards along the turret axis by the engagement of the threads 21 on the post with the threads 32 on the rotationally fixed mount, causing the plunger to engage with and move the tubular inner housing 42 in the same direction, thereby adjusting the apparent position of the graphic pattern 52 in the telescopic image provided by the telescopic sight 1.

The plunger therefore extends away from the housing towards the actuation surface 73 of the manual adjustment control 12 with which the outer end surface 71 of the plunger is maintained in contact by the spring biasing means 41.

As the rotatable knob turns, the rotational movement is quantized by a click-stop mechanism 60 comprising a spring loaded assembly 75 and a series of axially extending ridges and grooves 77 on the inside of an annular bushing 78 seated in a cylindrical recess 79 inside the post 20. The spring loaded assembly has a biasing coil spring 72 that urges a shaft 74 at the end of which is a ball bearing tip 76 that bears against the series of axially extending ridges and grooves 77. The ball bearing tip 76 therefore oscillates in a direction transverse to the turret axis 15 as the ball bearing tip moves in a helical path over the axially extending ridges and grooves 77. As the ball bearing tip 76 clicks into engagement with each groove 77, the aiming point of the sight moves by a predetermined amount.

In this example, the cylindrical post 20, the tubular mount 22 and the click-stop mechanism 60 are the main components of the inner turret assembly 20, 22, 60.

The movement of the plunger 30 is therefore driven by the linkage mechanism provided by the inner turret assembly when the turret knob 14 is turned.

Optionally, each of the manual adjustment controls 12, 12' may comprise means for securing the rotational setting of the rotatable knob 14. Preferably, the mounting skirt 26 has a threaded outer surface 81, and the manual adjustment control 14, 20, 22, 60 further comprises at least one locking ring 51 with a threaded inner surface 80, the locking ring providing an adjustable end-stop to limit rotational movement in one direction of the rotatable turret knob.

Before assembly of the mounting skirt 26 to the collar 28, the lock rings 80 are screwed over a threaded outer surface 81 of the tubular mount 22. The arrangement is such that both lock rings may be turned to move towards the rotatable knob, with a first lock ring coming into abutting contact with the tubular skirt 18 and a second lock ring coming into contact with the first lock ring to hold this in rotational position. When sufficiently tightened, the rotational orientation of the knob is then fixed in place.

If any of the manual adjustment controls 14, 20, 22, 60 needs to be serviced or swapped for a different manual control, having for example different gradations in the axially extending ridges and grooves 77, or a different pitch of the matching threads 21, 32 on the post 20 and tubular mount 22, so that each click in sighting adjustment results in a more or less sensitive sighting adjustment of the aiming point, then a user can readily undo the mounting grub screws 31 to disconnect one of the manual adjustment controls and replace it with a another, similarly mountable, adjustment control. In doing this, the atmospheric seal of the housing is not disturbed.

The plunger 30 is therefore fully separable from the manual adjustment control 14, 20, 22, 60, including both the turret adjustment knob 14 and the linkage mechanism provided by the inner turret assembly 20, 22, 60, to remain slidably engaged in the port 35 when the manual adjustment control is removed from the housing 2 in order to maintain the atmospheric seal of the housing interior 40. Because the manual adjustment control 14 is connected to the housing in such a way that the manual adjustment control fully separates from the plunger without breaking the atmospheric seal, a user may readily disconnect one manual adjustment control 14 from the housing and replace it with another manual adjustment control having that provides different sighting characteristics, for example a different number of clicks per revolution of the turret knob, or a different sensitivity or range of movement for the plunger.

Preferably, as in the above example, the manual adjustment control is mounted to the housing around the plunger port, so that the plunger port is concealed and protected by the manual adjustment control.

As will be made clear from the following description, the collar 28 is one example of a seat on the housing for a mount of a removably attached manual adjustment control.

As shown most clearly in FIG. 4, this seat is provided by an insert 90 that is fixed inside a mounting aperture 91 in an external wall or main body 92 of the housing central portion 9. When the manual adjustment control comprises a skirt, the skirt preferably extends around the collar and the skirt and collar may then have interengaging formations by which the manual adjustment control is removably affixed to the housing.

The plunger port is provided by the hole 36, which is in the insert. Apart from the hole 36, the insert covers the mounting aperture. The insert also provides a base for the manual adjustment control 14, 20, 22, 60. Each insert 90 is held in place by a grub screw 93 that is screwed through the housing main body 92 to bear against a surface of the insert 90 inside the aperture 91. This surface may be flat, as drawn, or may comprise a groove into which the grub screw locates when tightened. The aperture and insert have a matching stepped cylindrical profile with an annular ledge 95 in the housing main body that provides a support and an O-ring seal 94 for the insert, such that the insert cannot fall or be pressed into the housing interior 40. The O-ring seal 94 is not broken when the manual adjustment control is changed and therefore maintains the atmospheric seal within the housing 2. The insert is therefore a plug that fills the aperture. Once secured in this way the insert 90 effectively becomes a permanent part of the housing 2 as there is no need to remove the insert in order to change or service the manual adjustment control.

The plug and the insert preferably have substantially flush adjacent internal surfaces 96, 97 inside the interior of the housing.

The mounting aperture may, however, be any other type of socket within an external surface of the housing or any other type of recess for holding the insert and for providing the port or passage through the housing for the plunger.

Figure 5:
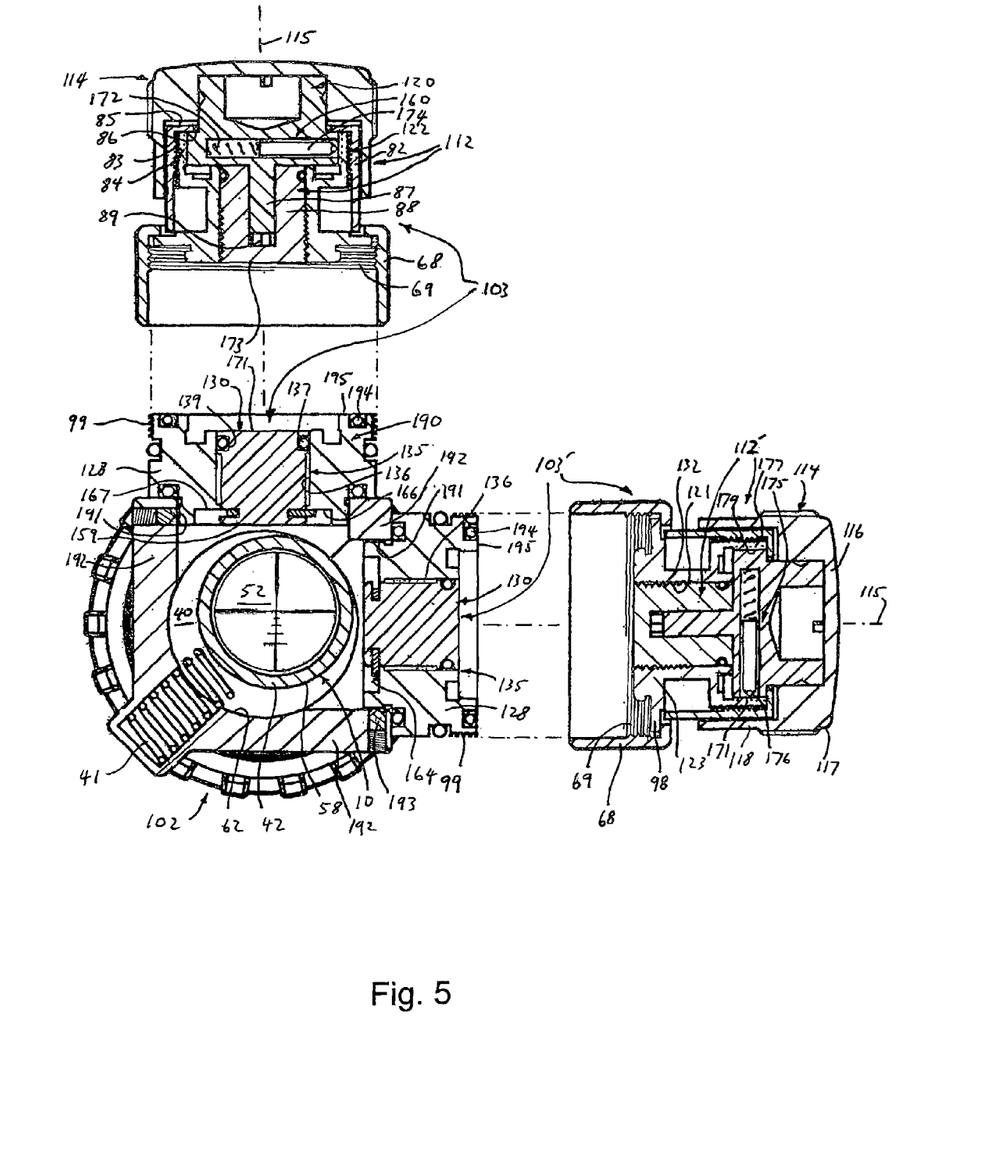
FIG. 5 is a is a cross-sectional view of a telescopic sight according to a second preferred embodiment of the invention in the same plane as FIG. 3, showing how a manual adjustment control for elevation and windage sighting adjustment mechanisms is removably affixed to the housing by means of a tubular skirt having a threaded inner surface that screws onto a threaded outer surface of a substantially cylindrical collar on the housing.
Figure 6:
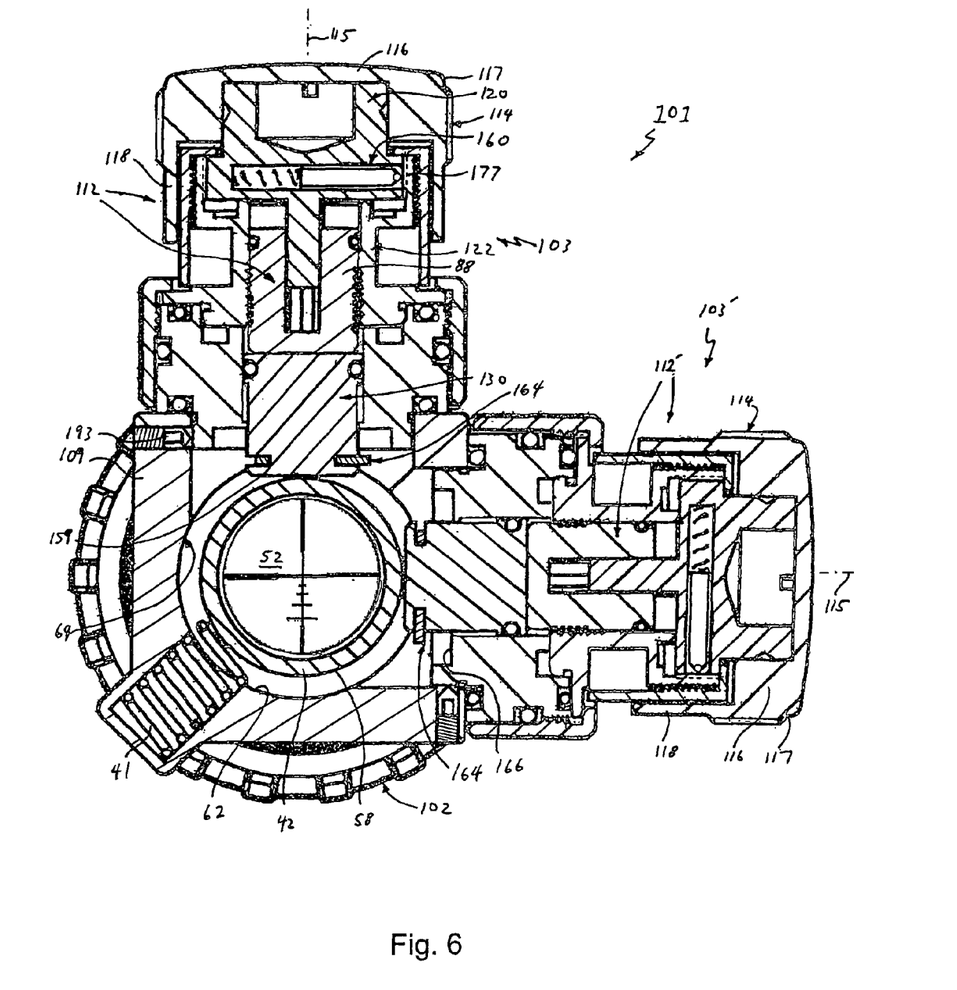
FIG. 6 is a cross-sectional view of the telescopic sight of FIG. 5 after the assembly of the manual adjustment control to the housing collar, showing how the manual adjustment control is arranged to move a plunger in and out of a port in the housing in order to adjust the position of a reticle.

FIGS. 5 and 6 show a second preferred embodiment of a telescopic sight 101 according to the invention. Features the same as those of the first embodiment are indicated using the same reference numerals. For the sake of conciseness, features which are the same as the first embodiment, in particular the arrangement of optical components, will not be described again in detail. Features which are similar or analogous to those to those of the first embodiment are indicated using reference numerals incremented by 100.

The telescopic sight 101 differs from that of the first embodiment in the form and functioning of the elevation and windage sighting adjustment mechanisms 103, 103'. Apart from the way the sighting adjustment mechanisms are secured to the housing 102 of the second embodiment, the housing 102 is the same as described above and shown in FIGS. 1 to 4.

Each sighting adjustment mechanism 103, 103' has a manual adjustment control 112, 112' and a movable plunger 130. In this example, each manual adjustment control is a turret assembly that comprises a rotatable turret adjustment knob 114 and an inner turret assembly 88, 120, 122, 160 that provides a linkage mechanism that converts the rotational movement of the turret knob 114 to movement of the plunger 130, as will be explained in more detail below.

The turret adjustment knob 114 is generally symmetrical about a turret axis 115 that extends at right angles to the housing optical axis 11. The turret knob has at its end a mounting disc 116 and around a periphery 117 of the disc a tubular skirt 118 that extends towards the housing axis 11. Together, the disc 116 and skirt 118, which are formed as a one-piece component, provide the turret adjustment knob 114 in the form of a rotatable cap which extends around the outermost or topmost part of the inner turret assembly 88, 120, 122, 160.

The disc 116 is mounted centrally by means of a grub screw (not shown) on a post 120 in the same manner as the first embodiment. The post is rotatably retained to a fixed tubular mount 122 by means of a first sleeve 82 that has a threaded inner surface 83 screwed to a threaded outer surface 84 of the mount. The post 120 and tubular mount 122 are therefore also parts of the manual adjustment control.

The sleeve is topped by an inwardly directed annular flange 85 that extends over an annular ledge 86 on the post such that the post can rotate freely inside the sleeve. A lower end of the post is an axially extending key 87 having a non-circular cross-section, preferably either square or rectangular. The manual adjustment control also comprises a movable piston 88. The piston has a similarly shaped axially extending recess 89 into which the key is engaged such that the piston is free to slide up and down the key 87.

The piston has a threaded outer surface 121 that is matingly engaged with a similarly threaded inner surface 132 of the tubular mount 122, such that, when rotation of the key causes the piston 88 to rotate, the piston mating threads cause the piston to move one way or the other along the turret axis 115.

A lower end 123 of the tubular mount 122 has an outwardly directed annular flange 98, and also a second sleeve 68 that has a threaded inner surface 69 that is screwed to a threaded outer surface 99 around an annular collar 128 on the housing 102 that extends away from the housing axis 11 and around the turret axis 115. The second sleeve 68, when removably secured to the collar 128, clamps the annular flange 89 at the lower end 123 of the tubular mount 122 against an annular ledge 195 atop the collar, which includes an O-ring seal 194 for making a seal between the housing 102 and manual adjustment control 88, 114, 120, 122.

The second sleeve is in the form of a skirt 68 that may therefore be unscrewed and disengaged from the collar 128 to separate the tubular mount 122, and hence the rotatable cap 116, 118, from the housing 102. The skirt 68 substantially conceals the collar 128 when the manual adjustment control is affixed to the housing.

Therefore, in this embodiment, there are interengaging formations between the collar and the mounting skirt in the form of a threaded inner surface on the skirt and a threaded outer surface on the collar, these threaded surfaces being screwed together in order to removably affix the manual adjustment control to the housing.

The movable plunger 130 of each sighting adjustment mechanism 103, 103' is configured to move in a direction transverse to the optical axis 11 of the telescopic sight 101. The plunger is slidably engaged in a port 135 that extends through the housing towards the housing axis 11. Both the plunger port 135 and the mounting collar 128 are centred on the housing axis 115. The port comprises a hole 136 that provides a substantially cylindrical passage through the housing and a seal 137 for sealably engaging with the plunger as the plunger slides along the turret axis in either direction, towards or away from the housing axis. In this example, the seal comprises a single O-ring 137 seated in an annular groove 139 in the plunger 130. The O-ring may be of a synthetic rubber material, and may be lubricated with an inert silicone gel to provide smooth movement of the plunger. The seal should be good enough to provide an atmospheric seal so that the interior portion 40 of the telescopic sight inside the housing 102 is isolated from external atmospheric humidity or liquid water or other contaminants that come into contact with the sight. Preferably, the housing interior portion 40 is filled with dry nitrogen gas during manufacture and assembly of the telescopic sight 101.

As in the first embodiment, the plunger is spring biased in a direction away from the housing axis 115 by a coil spring 41 that acts against the movable tubular inner housing 42. The plunger port is therefore between the manual adjustment control and the movable inner housing.

As in the first embodiment, the movable inner tubular member 42 is biased by the spring 41 such that the outer surface 58 of the tubular member 42 presses against a plunger inner end surface 159 of each the plungers 130 when each plunger is moved and positioned by the corresponding manual adjustment control 88, 114, 120, 122 to extend inside the housing interior 40.

The plunger 130 remain attached to the housing at all times in order to help preserve the isolation of the housing interior 40 from the external environment, even when the tubular mount 122 is disconnected from the mounting collar 128 of the housing. Furthermore, each of the plungers maintains an atmospheric seal in the housing interior 40 with the help of the seal 137 in the corresponding plunger port 135 as the plunger 130 moves within limits of movement along the turret axis 115.

In one direction of movement towards the housing axis 11, the movement of each plunger is limited by contact of the movable inner tubular mount 42 when this contacts the internal surface 62 of the housing opposite the port 135. In the opposite direction of motion outwards along the turret axis 115, the movement of the plunger is limited by a retention feature 164 on the plunger within the sealed interior of the housing. In this example, and as shown most clearly in FIG. 5, the retention feature is provided by an end-stop in the form of an annularly projecting circlip 164 that contacts an abutment, here an inner surface 166 of the housing interior, which is in a recess 167 that fully accommodates the circlip so that this can retract fully to a position that is recessed relative to the cylindrical bore 69 in the central portion of the housing interior 40. During manufacture, this allows the plungers 130 to be moved to a recessed position that does not interfere with the assembly of the adjustable sighting assembly 10 inside the housing 102.

When the manual adjustment control 112, 112' of each sighting adjustment mechanism 103, 103' is to be attached to the housing 102 by the tubular mount 122, each of the plungers 130 is pressed inwards along the turret axis 115 when an outer end surface 171 of a plunger stem 170 comes into abutting contact with an opposing end surface 173 of the piston 88. The end surface 173 of the piston 88 is therefore an actuation surface of the manual adjustment control. This abutting contact allows relative rotational movement of the piston 88 and plunger 130. The post 120 is rotationally fixed to the rotatable knob 114, and so as the knob is turned in one direction, the post 120 rotates and causes the piston to be driven inwards along the turret axis as described above, causing the plunger to engage with and move the tubular inner housing 42 in the same direction, thereby adjusting the apparent position of the graphic pattern 52 in the telescopic image provided by the telescopic sight 101.

As the rotatable knob turns, the rotational movement is quantized by a click-stop mechanism 160 comprising a spring loaded assembly 175 and a series of axially extending ridges and grooves 177 on the inside of a cylindrical recess 179 inside the post 120. The spring loaded assembly has a biasing coil spring 172 that urges a shaft 174 at the end of which is a ball bearing tip 176 that bears against the series of axially extending ridges and grooves 177. The ball bearing tip 176 therefore oscillates in a direction transverse to the turret axis 115 as the ball bearing tip moves in a circular path over the series of axially extending ridges and grooves 177. As the ball bearing tip 176 clicks into engagement with each groove 177, the aiming point of the sight moves by a predetermined amount.

In this example, the cylindrical post 120, the tubular mount 122, the movable piston 88 and the click-stop mechanism 160 provide the inner turret assembly. The movement of the plunger 130 is therefore driven by the inner turret assembly 120, 122, 88, 160 when the turret knob 114 is turned.

The plunger 130 is fully separable from the manual adjustment control 112, 112', including both the turret adjustment knob 114 and the inner turret assembly 120, 122, 160, to remain slidably engaged in the port 135 when the manual adjustment control is removed from the housing 102 in order to maintain the atmospheric seal of the housing interior 140. Therefore, as in the first embodiment, each of the manual adjustment controls 88, 114, 120, 122, 160 fully separates from the associated plunger so that one manual adjustment control can readily be changed by a user for a different manual adjustment control without damaging the atmospheric seal of the housing interior portion.

In the second embodiment the collar is another example of a seat on the housing for a mount of a removably attached manual adjustment control. As in the first embodiment, the seat is provided by an insert 190 that is fixed inside a mounting aperture 191 in an external wall or main body 192 of the housing central portion 109. The second sleeve 68 provides a skirt that extends protectively around the collar 128.

The plunger port is provided by the hole 136, which is in the insert. Apart from the hole 136, the insert covers the mounting aperture. The insert also provides a base for the manual adjustment control 88, 114, 120, 122. The insert therefore provides a base for the manual adjustment control. Each insert 190 is held in place by a grub screw 193 that is screwed through the housing main body 192 to bear against a flat or grooved surface of the insert 190 inside the aperture 191. The aperture and insert have a matching stepped cylindrical profile with an annular ledge 195 on the housing main body that provides a support and an O-ring seal 194 for the insert, such that the insert cannot fall or be pressed into the housing interior 40. The insert is therefore a plug that fills the aperture. Once secured in this way the insert 190 effectively becomes a permanent part of the housing 102 as there is no need to remove the insert in order to change or service the manual adjustment control.

Figure 7:
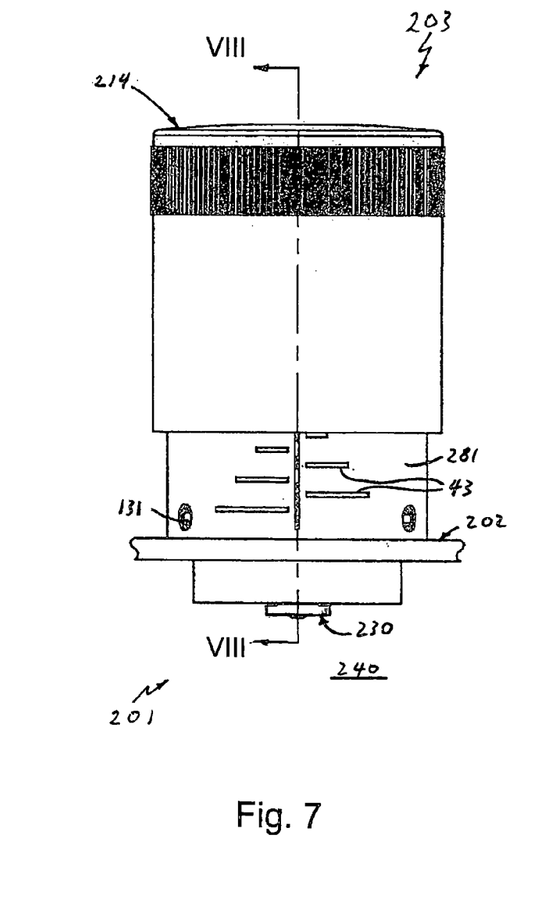
FIG. 7 is a side view of a part of a telescopic sight according to a third preferred embodiment of the invention, in which a manual adjustment control for elevation and windage sighting adjustment mechanisms is removably affixed to the housing in a similar manner to that of the first preferred embodiment.
Figure 8:
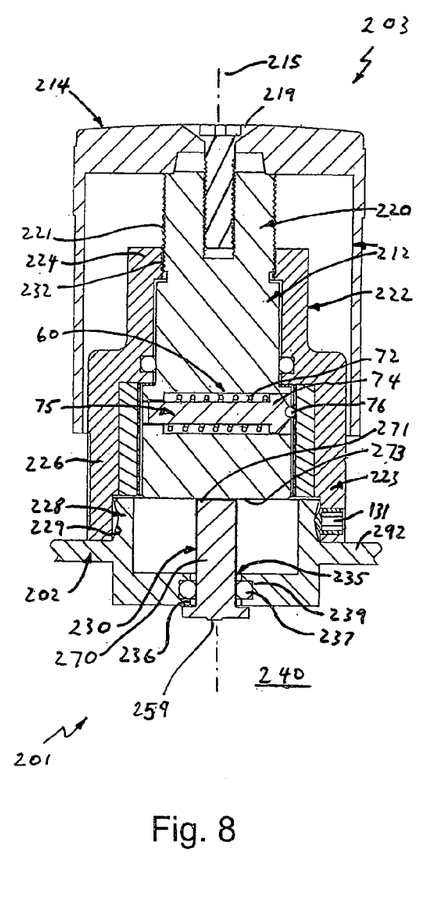
FIG. 8 is a cross-sectional view of the manual adjustment control and housing, taken along line VIII-VIII of FIG. 7.
Figure 9:
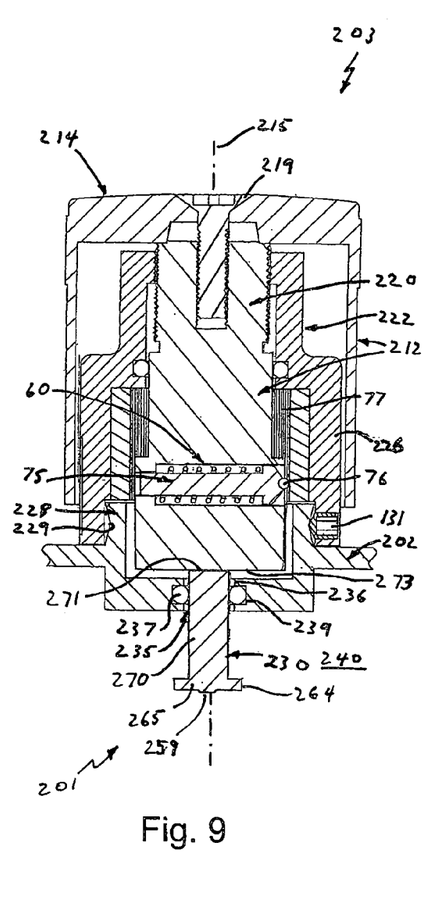
FIG. 9 is a cross-section view similar to that of FIG. 8, showing how a plunger moves between retracted and extended positions when a turret knob is turned.

FIGS. 7 to 9 show a part of a telescopic sight 201 according to a third preferred embodiment of the invention, which is similar to the first embodiment 1. Features which are the same as the first embodiment are indicated using the same reference numerals, and will therefore not be described in detail again. The optical system of the telescopic sight 201 is the same as in the previous embodiments, and so is not illustrated or described again in full. The main difference with the first embodiment is the way in which a seat 228 is provided on a housing 202 for the manual adjustment control 212.

As in the first embodiment, the manual adjustment control 212 comprises a turret adjustment knob 214 and a substantially cylindrical post 220 on which the knob is mounted. Inside the knob, the manual adjustment control comprises a tubular mount 222 that is fixed in position relative to the housing and that also provides a tubular support for the post, which moves up and down inside the mount, driven by the same type of threaded engagement as in the first embodiment.

Differences with the first embodiment include the way in which a mounting skirt 226 of the manual adjustment control 212 is affixed to the post 220, and the particular form of the mounting skirt 226, which has an outer surface 281 that is not threaded, but which has a scale 43 indicating the movement of an internal plunger 230.

In this embodiment, the turret knob 214 is affixed to the post 220 by a central bolt 219. A mounting collar 228 and plunger port 235 are integrally formed in one piece with the rest of a housing body 292. The collar 228 and housing body 292 are therefore all part of a unitary, one-piece body, rather than being formed from separate components. There is therefore no separate insert affixed to the housing body.

A plunger seal is provided by a single O-ring 237 inside a matching groove 239 in a hole 236 through the housing to provide the port. As in the previous embodiments, the plunger is prevented from coming out of the port when the manual adjustment control is removed from the housing by means of a retention feature 264, which is here a plunger head 265. The retained plunger and the plunger seal then maintain the atmospheric seal of a housing interior 240.

The mount 222 has a large diameter end 223 which provides the mounting skirt 226, as in the first embodiment. The skirt makes a close sliding fit around the annular mounting collar 228 on the housing 202 that extends away from the housing axis and is secured around a turret axis 215 by three grub screws 131 evenly spaced apart around the circumference of the mounting skirt 226 and that engage with a groove or channel 229 that extends around the collar 228.

A small diameter end 224 of the tubular mount 222 has an inwardly threaded ring 232 into which a threaded portion 221 of the post is screwed. When the turret knob 214 is manually turned, the post 220 rotates about the turret axis 215 thus causing this threaded engagement between the post 20 and the tubular mount 222 to move the post 220 either in towards or away from the housing 202 along the turret axis 215.

An end surface 273 of the cylindrical post 220 is in abutting contact with an opposed outer end surface 271 of a stem 270 of the plunger. The post end surface 273 is therefore an actuation surface of the manual adjustment control for moving the plunger along the turret axis 215. This abutting contact allows relative rotational movement between the post and the plunger. A plunger inner end surface 259, which bears against a movable member of the same type as described above, then causes the sighting adjustment.

As in the previous embodiments, the manual adjustment control 212 comprises a click-stop mechanism 60, and fully separates from the associated plunger 230 so that one manual adjustment control can readily be changed by a user for a different manual adjustment control without damaging the atmospheric seal of the housing interior portion 240.

The invention therefore provides a number of convenient and economical ways of removing and replacing a manual adjustment control in a sighting adjustment mechanism of a telescopic sight for a firearm, without the need for additional measures to maintain or replace an atmospheric seal to the interior of a housing on which the manual adjustment control is mounted. Furthermore, because the manual adjustment control is fully separable from the associated plunger, it is possible for a user to change any of the sighting characteristics provided by the manual adjustment control, for example, the number of clicks per revolution, the total range of movement of the plunger, and the degree of movement of the plunger for a given rotational movement of the turret knob. In the event that any part of the turret assembly providing the manual adjustment control becomes damaged, worn or affected by dirt or contamination, a user may also replace the entire turret assembly with another turret assembly having the same sighting characteristics. Similarly, a user may fit an improved or upgraded manual adjustment control.

It is to be recognized that various alterations, modifications, and/or additions may be introduced into the constructions and arrangements of parts described above without departing from the spirit or scope of the present invention, as defined by the appended claims.

The invention claimed is:

1. A telescopic sight for a firearm, comprising a housing, an optical system housed by the housing for presenting a telescopic image and an aiming point in said image to a user of the telescopic sight, and at least one sighting adjustment mechanism for making a sighting adjustment of said aiming point relative to said image, said sighting adjustment mechanism comprising a movable plunger and a manual adjustment control configured to move said movable plunger, the manual adjustment control comprising a rotatable turret knob, the turret knob being accessible to said user on the housing for manually effecting said sighting adjustment, wherein:

the optical system comprises within the housing at least one movable member, movement of said movable member causing said sighting adjustment;

the housing has a port therethrough, the plunger being slidably engaged in said port and linking the manual adjustment control with the movable member whereby, in use, the manual adjustment control causes the plunger to slide in said port when the turret knob is rotated resulting in said movement of the movable member to make said sighting adjustment, said slideable engagement being such that the housing interior remains atmospherically sealed as the plunger slides in said port; and the manual adjustment control is removably affixed to the housing, characterised in that the manual adjustment control comprises an actuation surface that makes abutting contact with an outer end surface of a stem of the plunger so that when the manual adjustment control is to be disconnected from the housing in order to remove the manual adjustment control from the housing, the actuation surface separates from said outer end surface to enable the manual adjustment control to fully separate from the plunger whereby the plunger remains slidably engaged in said port in order to maintain said atmospheric seal of the housing interior when the manual adjustment control is removed from the housing.

2. A telescopic sight as claimed in claim 1, in which at least one retention feature is provided between the plunger and the housing to prevent the plunger from being withdrawn from the port when the manual adjustment control is removed from the housing in order to ensure that said atmospheric seal of the housing interior is not lost by removal of the plunger from said port.

3. A telescopic sight as claimed in claim 2 in which said retention feature comprises an end-stop on the plunger within said sealed interior of the housing.

4. A telescopic sight as claimed in claim 2, in which said retention feature is a projecting flange that engages with an abutment inside the housing.

5. A telescopic sight as claimed in claim 4, in which the flange is at an endmost portion of the plunger.

6. A telescopic sight as claimed in claim 4, in which the plunger is substantially cylindrical and the flange is annular.

7. A telescopic sight as claimed in claim 1, in which the manual adjustment control comprises a click-stop mechanism for quantizing said rotation of the turret knob.

8. A telescopic sight as claimed in claim 1, in which the manual adjustment control comprises a linkage mechanism that converts the rotational movement of the turret knob to said movement of the plunger, the linkage mechanism comprising said actuation surface.

9. A telescopic sight as claimed in claim 8, in which the linkage mechanism is provided by an inner turret assembly, the turret knob extending around the inner turret assembly.

10. A telescopic sight as claimed in claim 1, in which said movement of said movable member is in a direction transverse to an optical axis extending between objective and eyepiece lenses of the telescopic sight.

11. A telescopic sight as claimed in claim 1, in which said port is between the manual adjustment control and the movable member.

12. A telescopic sight as claimed in claim 10, in which the housing has a main body, said main body extending over at least a central portion of the housing between said objective and eyepiece lenses, and said port is provided by a hole in said main body.

13. A telescopic sight as claimed in claim 1, in which the housing comprises on an external surface thereof a seat and the manual adjustment control is removably affixed to the housing by means of the seat.

14. A telescopic sight as claimed in claim 13, in which the port is provided by a hole in the seat.

15. A telescopic sight as claimed in claim 13, in which the housing has an external wall with a mounting aperture and an insert affixed to said wall to cover said aperture, the insert providing said seat.

16. A telescopic sight as claimed in claim 15, in which the insert comprises a plug that fills said aperture.

17. A telescopic sight as claimed in claim 15, in which the mounting aperture and the insert have matching stepped cylindrical shapes.

18. A telescopic sight as claimed in claim 16, in which a sealing member is provided between the insert and the mounting aperture to help maintain the atmospheric seal of the housing interior.

19. A telescopic sight as claimed in claim 15, in which the insert is affixed to the external wall of the housing by means of a grub screw in said external wall which engages with a surface of said insert.

20. A telescopic sight as claimed in claim 13, in which the seat has a collar and the manual adjustment control has a skirt, the skirt extending around the collar and the skirt and collar having interengaging formations by which the manual adjustment control is removably affixed to the housing.

21. A telescopic sight as claimed in claim 20, in which said interengaging formations comprise an outwardly facing channel on the collar and at least one inwardly facing grub screw, said grub screw being engaged with said channel in order to removably affix the manual adjustment control to the housing.

22. A telescopic sight as claimed in claim 20, in which the skirt substantially conceals the collar when the manual adjustment control is affixed to the housing.

23. A telescopic sight as claimed in claim 20, in which the skirt has a threaded outer surface, and the manual adjustment control further comprises at least one locking ring with a threaded inner surface, said locking ring providing an adjustable end-stop to limit rotational movement in one direction of the rotatable turret knob.

24. A telescopic sight as claimed in claim 1, in which there are two of said sighting adjustment mechanisms each having a manual adjustment control accessible to said user on the housing for manually effecting a sighting adjustment of said aiming point relative to said image along two corresponding orthogonal directions.

25. A telescopic sight kit comprising a telescopic sight for a firearm, said telescopic sight comprising a housing, an optical system housed by the housing for presenting a telescopic image and an aiming point in said image to a user of the telescopic sight, and at least one sighting adjustment mechanism for making a sighting adjustment of said aiming point relative to said image, said sighting adjustment mechanism comprising a movable plunger and a manual adjustment control configured to move said movable plunger, the manual adjustment control comprising a rotatable turret knob, the turret knob being accessible to said user on the housing for manually effecting said sighting adjustment, wherein:

the optical system comprises within the housing at least one movable member, movement of said movable member causing said sighting adjustment;

the housing has a port therethrough, the plunger being slidably engaged in said port and linking the manual adjustment control with the movable member whereby, in use, the manual adjustment control causes the plunger to slide in said port when the turret knob is rotated resulting in said movement of the movable member to make said sighting adjustment, said slideable engagement being such that the housing interior remains atmospherically sealed as the plunger slides in said port; and the manual adjustment control is removably affixed to the housing, characterised in that the manual adjustment control comprises an actuation surface that makes abutting contact with an outer end surface of a stem of the plunger so that when the manual adjustment control is to be disconnected from the housing in order to remove the manual adjustment control from the housing, the actuation surface separates from said outer end surface to enable the manual adjustment control to fully separate from the plunger whereby the plunger remains slidably engaged in said port in order to maintain said atmospheric seal of the housing interior when the manual adjustment control is removed from the housing; and wherein the telescopic sight kit further comprises, separate from the telescopic sight, at least one manual adjustment control that is interchangeable with at least one manual adjustment control of the telescopic sight without breaking the atmospheric seal of the housing interior.

\* \* \* \* \*